United States Patent
Serebrin et al.

(10) Patent No.: US 9,519,548 B2
(45) Date of Patent: Dec. 13, 2016

(54) INCREASING GRANULARITY OF DIRTY BIT INFORMATION

(71) Applicant: VMware, Inc., Palo Alto, CA (US)

(72) Inventors: Benjamin C. Serebrin, Sunnyvale, CA (US); Bhavesh Mehta, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/588,594

(22) Filed: Jan. 2, 2015

(65) Prior Publication Data

US 2015/0186220 A1    Jul. 2, 2015

Related U.S. Application Data

(62) Division of application No. 13/096,755, filed on Apr. 28, 2011, now Pat. No. 8,943,296.

(51) Int. Cl.
*G06F 11/14* (2006.01)
*G06F 12/10* (2016.01)
*G06F 9/455* (2006.01)

(52) U.S. Cl.
CPC ....... *G06F 11/1451* (2013.01); *G06F 11/1464* (2013.01); *G06F 12/1018* (2013.01); *G06F 12/1027* (2013.01); *G06F 2009/45583* (2013.01); *G06F 2201/815* (2013.01); *G06F 2201/84* (2013.01); *G06F 2212/651* (2013.01); *G06F 2212/657* (2013.01)

(58) Field of Classification Search
CPC ................. G06F 2009/45583; G06F 9/45558
See application file for complete search history.

(56) References Cited

U.S. PATENT DOCUMENTS

| | | | |
|---|---|---|---|
| 5,526,504 A | 6/1996 | Hsu et al. | |
| 6,381,686 B1 | 4/2002 | Imamura | |
| 6,725,366 B1 | 4/2004 | Swanberg | |
| 6,728,859 B1 | 4/2004 | Kissell | |
| 2007/0214340 A1 | 9/2007 | Leveille et al. | |
| 2009/0182976 A1 | 7/2009 | Agesen | |
| 2009/0187726 A1 | 7/2009 | Serebrin et al. | |
| 2009/0313445 A1 | 12/2009 | Pandey et al. | |
| 2010/0299666 A1* | 11/2010 | Agbaria | G06F 9/4856 718/1 |
| 2011/0004739 A1 | 1/2011 | Hohmuth et al. | |
| 2011/0023027 A1 | 1/2011 | Kegel et al. | |
| 2011/0167196 A1 | 7/2011 | Scales et al. | |
| 2011/0320556 A1* | 12/2011 | Reuther | G06F 9/4856 709/213 |

(Continued)

OTHER PUBLICATIONS

"AMD-V™ Nested Paging", White Paper, Jul. 2008, pp. 1-19 Revision: 1.0 Advanced Micro Devices, Inc.

(Continued)

*Primary Examiner* — Ryan Bertram (57) ABSTRACT

One or more unused bits of a virtual address range are allocated for aliasing so that multiple virtually addressed sub-pages can be mapped to a common memory page. When one bit is allocated for aliasing, dirty bit information can be provided at a granularity that is one-half of a memory page. When M bits are allocated for aliasing, dirty bit information can be provided at a granularity that is $1/(2^M)$-th of a memory page.

20 Claims, 6 Drawing Sheets

(56) References Cited

U.S. PATENT DOCUMENTS

2012/0102135 A1    4/2012   Srinivasan et al.
2012/0246437 A1    9/2012   Radovic et al.
2012/0278525 A1   11/2012   Serebrin et al.
2013/0024598 A1    1/2013   Serebrin et al.

OTHER PUBLICATIONS

K. Adams, et al. "Comparison of Software and Hardware Techniques for x86 Virtualization", Proceedings of ASPLOS XII, Oct. 2006, pp. 1-12.
R. Bhargava, et al. "Accelerating Two-Dimensional p. Walks for Virtualized Systems", Proceedings of ASPLOS XIII, Mar. 2008, pp. 1-10.
Office Action dated Nov. 7, 2013 in counterpart U.S. Appl. No. 13/096,755.
Final Office Action dated Apr. 30, 2014 in counterpart U.S. Appl. No. 13/185,008.
Final Office Action dated May 28, 2014 in counterpart U.S. Appl. No. 13/096,755.
Office Action dated Nov. 20, 2014 in counterpart U.S. Appl. No. 13/185,008.
Office Action dated Aug. 29, 2013 in counterpart U.S. Appl. No. 13/185,008.

* cited by examiner

FIGURE 6

INCREASING GRANULARITY OF DIRTY BIT INFORMATION

The present application is a divisional of and claims benefit of earlier-filed U.S. patent application Ser. No. 13/096,755, filed on Apr. 28, 2011.

BACKGROUND

Modern computers employ virtual memory to decouple processes, e.g., applications running on top of an operating system, from the physical memory addresses backing the address space of the processes. Using virtual memory enables processes to have a large contiguous address space, and allows the computer to run more processes than can fit simultaneously in their entirety in the available physical memory (i.e., to "over-commit" memory). To do this, virtual memory space is divided into pages of a fixed size (for example, x86 architectures use page sizes of 4 KB, 2 MB, or 1 GB), and each page of the virtual memory space either maps onto a page within the physical memory of the same page size or it maps to nothing. Much of the description in this patent will be in terms of x86 architectures. However, a person of skill in the art will understand how to apply the teachings of the invention to other processor architectures.

Translation of a virtual memory address to a physical memory address is done by traversing page tables in memory that contain mapping information. To speed up translation, a translation look-aside buffer (TLB) is typically used. The TLB provides faster translation of virtual addresses to physical addresses than does accessing page tables in memory because the TLB can provide the beginning-to-end mapping in a single step, and because the TLB can be implemented in a small (and, therefore, fast to access) data structure closer to or in the CPU itself. However, the TLB is limited in size and it is possible that a virtual memory page cannot be found in the TLB. Whenever this happens, a "TLB miss" occurs, and the mapping has to be performed by a traversal of the page tables, commonly known as a "page walk," a much slower process than look-ups in the TLB.

In virtualized computer systems, where multiple virtual machines, each having an operating system and applications running therein, can be configured to run on a single hardware platform, memory management for the virtual machines is carried out by the emulated memory management units (MMUs). One emulated MMU is provided for each virtual machine and the emulated MMU manages the mappings of guest virtual addresses directly to physical memory addresses, also referred to as machine memory addresses, using shadow page tables. Shadow page tables have the same structure as conventional page tables and, as with conventional page tables, shadow page tables need not be traversed if the guest virtual address that needs to be mapped has an entry in the TLB.

Both conventional page tables and shadow page tables are hierarchically arranged and a pointer to the top-level, root table is stored in a register. In x86 architectures, this register is known as the CR3 register, and it should be recognized that non-x86 architectures employing page tables may have different structures and accessed in a different manner. A series of intermediate-level tables is traversed to reach bottom-level tables that have page table entries (PTEs) containing pointers to memory pages and auxiliary information including an accessed bit (A bit), a dirty bit (D bit), and various other bits. The A bit, if set to one, indicates that the memory page referenced by the entry has been accessed since the A bit was last cleared. The D bit, if set to one, indicates that the memory page referenced by the entry has been modified since the D bit was last cleared. The dirty bit may be cleared, i.e., set to zero, when the contents of the modified memory page are committed to disk.

A bits and D bits are examined by various processes before taking some action. In a virtualized computer system, D bits of PTEs are continuously examined during a process for performing backups and during a process for migrating the executing state of virtual machines, to identify those memory pages that have been modified and to transmit to the backup target machine or the migration target machine only those memory pages that have been modified. Alternatively, an operation known as a "diff" operation may be performed on the memory pages that have been modified to identify the changed portions of the memory pages, and only the changed portions are transmitted to the target machine.

When page sizes are relatively large, the efficiency of processes such as the backup process and the migration process is compromised because any modification of a memory page regardless of the size of the modification will cause that memory page to be backed up or migrated. For example, if the memory page size is 4 KB and 8 bytes were written to that memory page, the entire 4 KB page will need to be backed up or migrated. It may be possible to build x86 page tables with smaller memory page sizes but this might not be desirable because such a change could affect memory system performance adversely in other ways or be an implementation burden.

SUMMARY

One or more embodiments of the present invention provide techniques for increasing the granularity of dirty bit information without changing the default memory page size and without changes to existing memory management hardware. According to such techniques, one or more unused bits of a virtual address range are allocated for aliasing so that multiple page table entries can be mapped to a common memory page. When one bit is allocated for aliasing, dirty bit information can be provided at a granularity that is one-half of a memory page. When two bits are allocated for aliasing, dirty bit information can be provided at a granularity that is one-fourth of a memory page. In general, when N bits are allocated for aliasing, a granularity of $2^N$ sub-regions of a memory page is achieved.

A data structure according to an embodiment of the present invention includes a set of tables that are hierarchically arranged, and the set of tables includes a root table and a plurality of bottom-level tables, wherein each entry of the bottom-level tables references a physical memory page in common with at least one other entry of the bottom-level tables, and the at least two entries that reference the physical memory page in common provide different indications as to whether the physical memory page is dirty or not.

A method of mapping virtual addresses to physical memory pages in a computer system, according to an embodiment of the present invention, includes the steps of receiving a binary representation of a virtual address to be mapped, modifying the binary representation by copying the value of a first bit of the binary representation to a second bit of the binary representation, wherein the second bit is more significant than the first bit, and generating a mapping for the virtual address using the modified binary representation.

A method of backing up a virtual machine, according to an embodiment of the present invention, includes the steps of scanning entries of first and second page tables that reference a common physical memory page, determining that a first section of the common physical memory page is dirty based on the entry of the first page table that references the common physical memory page and determining that a second section of the common physical memory page is not dirty based on the entry of the second page table that references the common physical memory page, performing an operation on the first section of the common physical memory page to determine changes to data stored in the first section of the common physical memory page, and transmitting the changes to the data stored in the first section of the common physical memory page to a backup system.

A method of migrating an executing state of a virtual machine running in a first computer system to a second computer system, according to an embodiment of the present invention includes the steps of scanning entries of first and second page tables that reference a common physical memory page, determining that a first section of the common physical memory page is dirty based on the entry of the first page table that references the common physical memory page and determining that a second section of the common physical memory page is not dirty based on the entry of the second page table that references the common physical memory page, and transmitting the first section of the common physical memory page to the second computer system.

Further embodiments of the present invention include, without limitation, a non-transitory computer-readable storage medium that includes instructions that enable a processing unit to implement one or more aspects of the above methods as well as a computer system configured to implement one or more aspects of the above methods.

DETAILED DESCRIPTION

Figure 1:
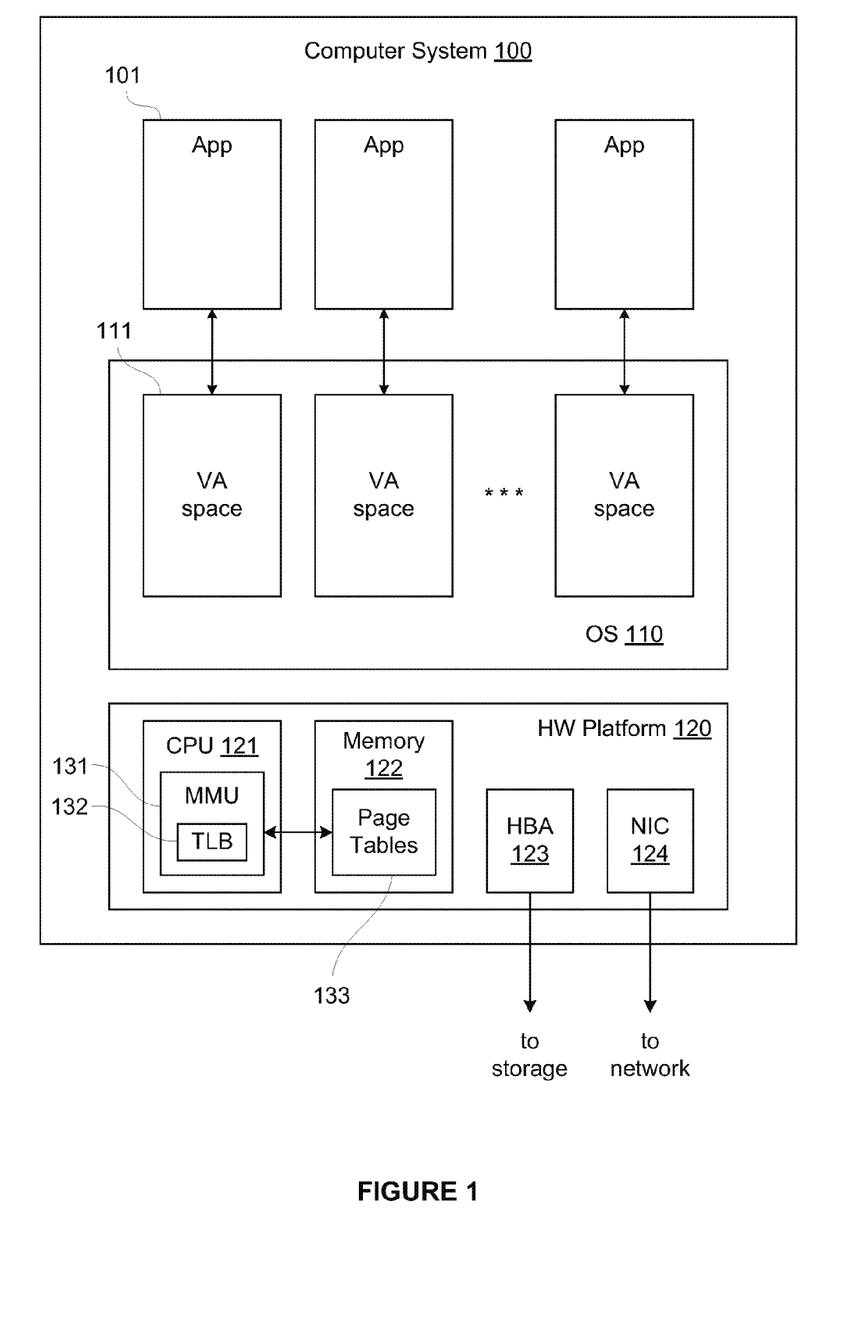
FIG. 1 depicts a block diagram of a computer system in which one or more embodiments of the present invention may be practiced.

FIG. 1 depicts a block diagram of a computer system in which one or more embodiments of the present invention may be practiced. Computer system 100 includes multiple applications, including application (App) 101, that are running on top of operating system (OS) 110. OS 110 includes a plurality of software layers including a kernel that manages hardware resources provided by hardware platform 120 through various drivers (not shown). OS 110 also manages a separate virtual address (VA) space for each of the applications that have been launched (e.g., VA space 111 for App 101). Hardware platform 120 includes one or more central processing unit (CPU) 121, system memory 122, a host bus adapter (HBA) 123 that connects computer system 100 to a persistent storage unit such as a disk array, and a network interface card (NIC) 124 that connects computer system 100 to a network. CPU 121 has a memory management unit (MMU) 131 that carries out the mappings from the virtual address space to the physical address space using either a translation look-aside buffer (TLB) 132 or page tables 133 stored in system memory 122.

Figure 2:
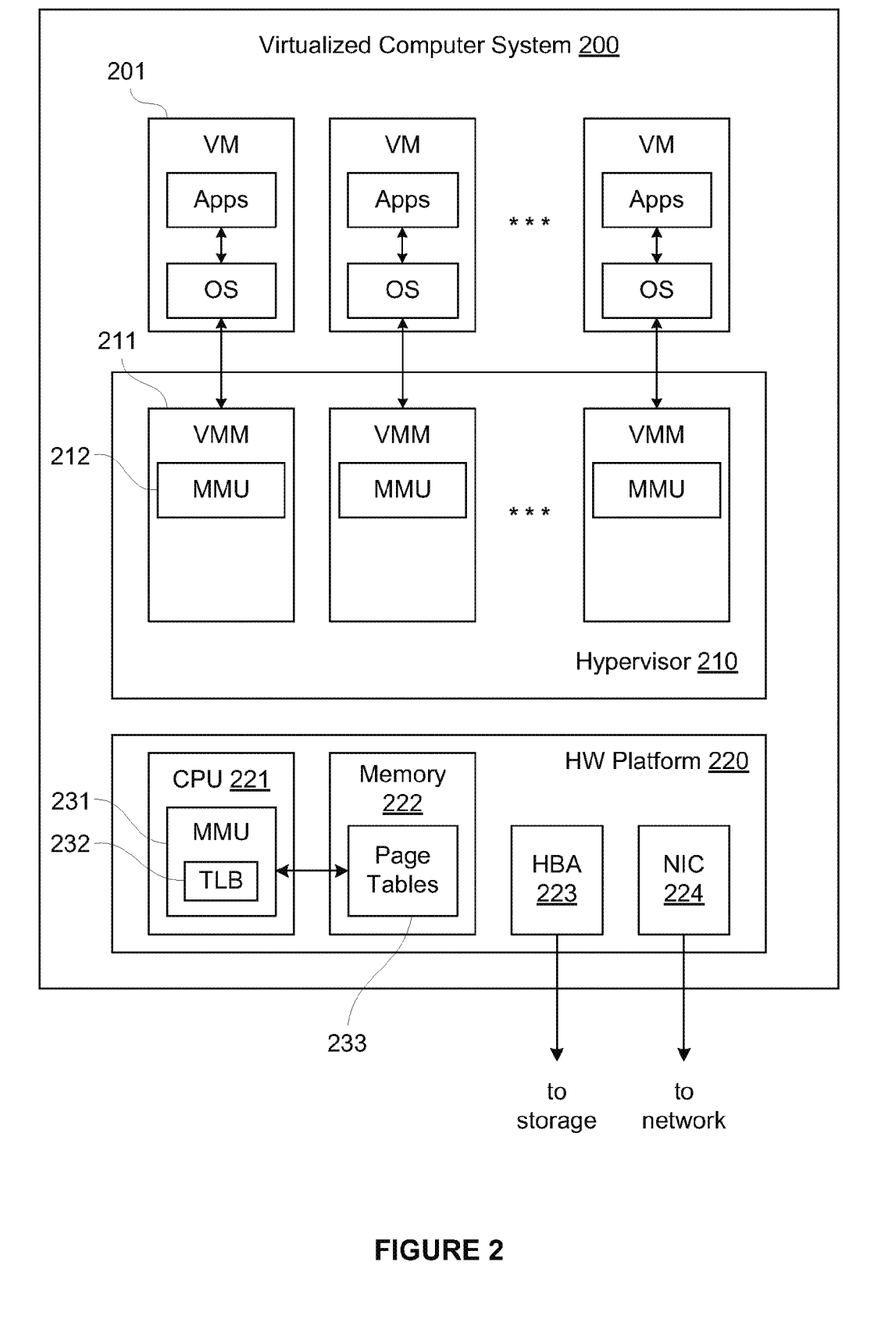
FIG. 2 depicts a block diagram of a virtualized computer system in which one or more embodiments of the present invention may be practiced.

FIG. 2 depicts a block diagram of a virtualized computer system in which one or more embodiments of the present invention may be practiced. Virtualized computer system 200 includes multiple virtual machines (VMs), including VM 201, that are running on top of hypervisor 210. Each VM is an abstraction of a physical computer system having virtual hardware resources and a guest operating system that provides guest applications running in the VM an interface to the virtual hardware resources. Hypervisor 210 includes a plurality of software layers including a kernel that manages hardware resources of hardware platform 220 through various drivers (not shown), and virtual machine monitors (VMMs) each emulating hardware resources, such as an MMU, for a corresponding one of VMs. In the example illustrated in FIG. 2, VMM 211 emulates MMU 212 for VM 201. Hardware platform 220 includes one or more central processing unit (CPU) 221, system memory 222, a host bus adapter (HBA) 223 that connects virtualized computer system 200 to a persistent storage unit such as a disk array, and a network interface card (NIC) 224 that connects virtualized computer system 200 to a network. CPU 221 has a memory management unit (MMU) 231 that carries out the mappings from the virtual address space to the physical address space using either a translation look-aside buffer (TLB) 232 or page tables 233 stored in system memory 222. The page tables 233 stored in memory 222 include guest page tables and shadow page tables. Guest page tables are maintained by the guest operating system of a particular VM to provide mapping from guest virtual address space to guest physical address space. Shadow page tables are maintained by the VMM and provide mappings from the guest virtual address space directly to the physical address space of system memory 222.

It should be recognized that the various terms, layers and categorizations used to describe the virtualization components in FIG. 2 may be referred to differently without departing from their functionality or the spirit or scope of the invention. One example of hypervisor 210 that may be used is included as a component of VMware's vSphere product, which is commercially available from VMware, Inc. of Palo Alto, Calif. ("VMware"). It should further be recognized that other virtualized computer systems are contemplated, such as hosted virtual machine systems, where hypervisor 210 is implemented in conjunction with an operating system installed on hardware platform 220. In addition, further details of memory management techniques in virtualized computer systems, including a more detailed discussion of shadow page tables, are provided in U.S. patent application Ser. No. 12/137,351, filed Jun. 11, 2008, the entire contents of which are incorporated by reference herein.

Figure 3:
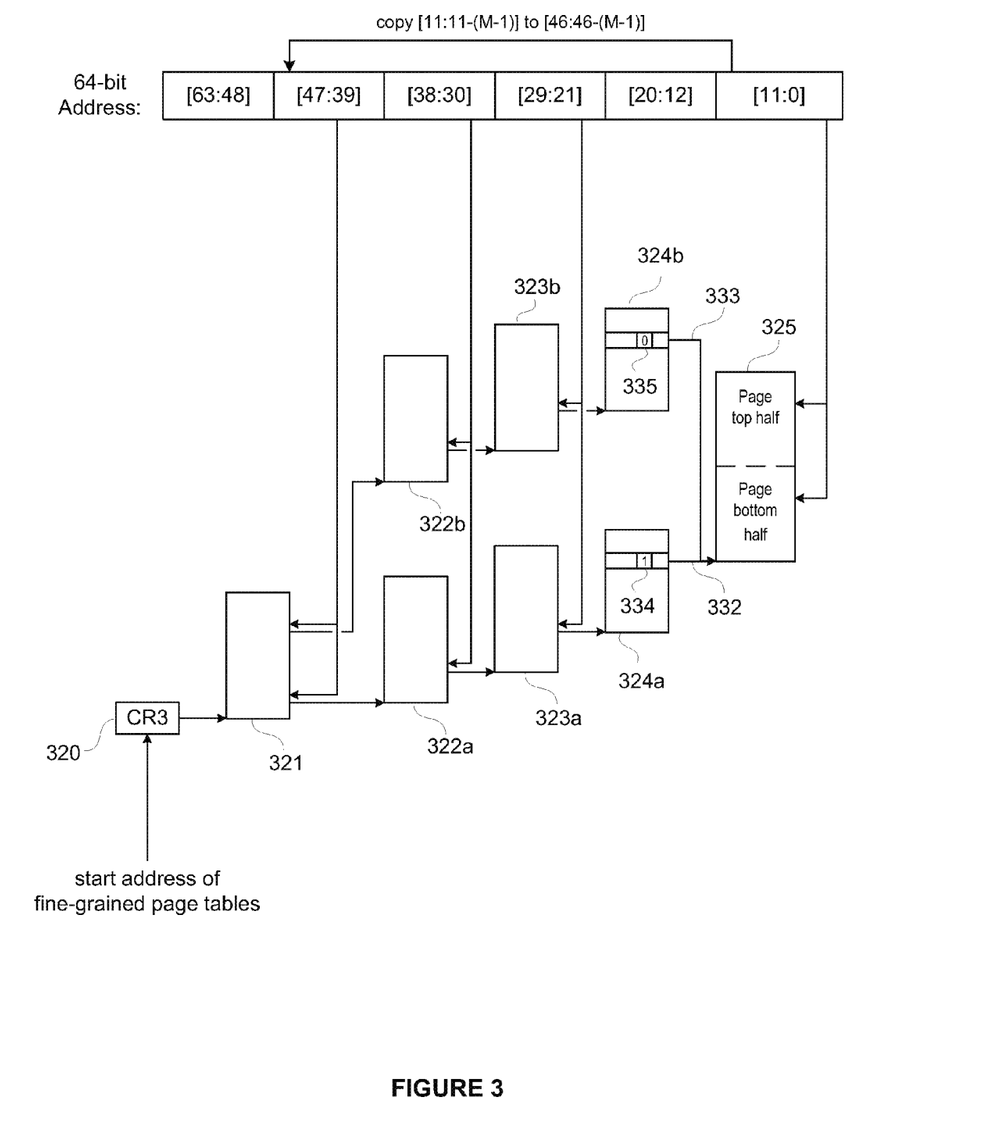
FIG. 3 is a schematic illustration of page tables used in one or more embodiments of the present invention.

FIG. 3 is a schematic illustration of fine-grained page tables used in one or more embodiments of the present invention. In a non-virtualized computer system such as the one depicted in FIG. 1, the page tables are maintained by OS 110. In a virtualized computer system such as the one depicted in FIG. 2, the page tables are maintained by the VMM of a corresponding VM.

Page tables depicted in FIG. 3 are arranged hierarchically. They include a single root table 321 having entries containing pointers to multiple second-level tables including page tables 322a, 322b, each having entries containing pointers to multiple third-level tables including page tables 323a, 323b, each having entries containing pointers to multiple fourth-level or bottom-level page tables including page tables 324a, 324b. Entries of bottom-level page tables contain pointers (e.g., pointers 332, 333) to physical memory pages (e.g., physical memory page 325). These entries also have a D bit (e.g., D bits 334, 335), the value of which indicates whether or not the portion of the physical memory page referenced by the entry is dirty. In one embodiment, a D bit value of one indicates that the referenced portion of the physical memory page is dirty and a D bit value of zero indicates that the referenced portion of the physical memory page is not dirty. In FIG. 3, D bit 334 has a value of 1, indicating that the bottom half of the physical memory page 325 referenced by the entry is dirty, and D bit 335 has a value of 0, indicating that the top half of the physical memory page 325 referenced by the entry is not dirty. The MMU (e.g., MMU 131 or MMU 231) obtains the location of root table 321 by accessing a register 320 (e.g., CR3 register in x86 architectures). Then, successive 9-bit segments of the binary representation of the virtual address are used to index into the page tables at different levels. The 12 least significant bits of the binary representation of the virtual address are used as an offset into physical memory page 325. Bits [63:48] are not used in the mapping in this embodiment as is the convention in memory management schemes for x86 architectures.

The structure of fine-grained page tables shown in FIG. 3 is the same as conventional page tables. However, during memory accesses, before mapping a virtual address to a physical address, values of M most significant bits from bits [11:0] of the virtual address are respectively copied into bit [46] to bit [46-(M−1)] of the virtual address. For example, if M is two, the values of bits [11:10] are copied into bits [46:45]. This copying may be performed by the MMU of a processor, for example, or by a hypervisor through the use of binary translation. Thus, for example, existing x86 processors may be modified to perform this copying when performing memory accesses. This copying creates $2^M$ aliased virtual address regions within the page tables. The contents of corresponding entries of bottom-level page tables in multiple aliased virtual address regions (e.g., bottom-level page table 324a and bottom-level page table 324b) are configured to reference the same physical memory page (e.g., physical memory page 325). If M is one, corresponding entries from two different bottom-level page tables reference the same physical memory page, the entry from the bottom-level page table corresponding to a value of zero at bit [11] being associated with the bottom half of the physical memory page and the entry from the bottom-level page table corresponding to a value of one at bit [11] being associated with the top half of the physical memory page. Thus, for example, referring to FIG. 3, second-level page table 322a, third-level page table 323a and bottom-level page table 324a correspond to bit [11] (and therefore also bit [46]) having a value of zero; while second-level page table 322b, third-level page table 323b and bottom-level page table 324b correspond to bit [11] (and therefore also bit [46]) having a value of one. As shown in FIG. 3, the values of the D bits of these entries (D bit 334 and D bit 335) may be different. This would happen if, as in the example shown in FIG. 3, the bottom half of the physical memory page was modified but the top half was not. This would also happen if the situation were reversed, where the bottom half of the physical memory page was not modified but the top half was. If M is two, corresponding entries from four bottom-level page tables reference the same physical memory page and each such entry is associated with a distinct quarter section of the physical memory page.

In the page table data structure illustrated in FIG. 3, when M is one, two different virtual addresses map to the same physical memory page. The difference in the binary representations of these two virtual addresses is the modification performed as described above that copies the 12-th least significant bit (bit [11]) into a more significant bit. More generally, if M is one and physical memory pages are managed in units of L bytes, the difference in the binary representations of these two virtual addresses is the modification performed as described above that copies the N-th least significant bit, where $2^N$=L, into a more significant bit.

Embodiments of the present invention described in conjunction with FIG. 3 employ page tables having a 4-level hierarchy and page sizes of 4 KB. It should be understood that the present invention is applicable to page tables having different levels of hierarchy and to different page sizes by monitoring D bits at higher levels in the page table hierarchy.

In an alternative embodiment, a hardware configuration register, whose bits [47:12] can be set or cleared by hypervisor 210, is provided. For each bit that is set in this bit vector, the corresponding bit of the virtual address is claimed as an alias bit. So if M bits are set in this configuration register, there are $2^M$ aliases. The hardware will then copy bits [11:(11-(M−1))] into the bit positions of the virtual address corresponding to the bits that are set in the hardware configuration register, from highest-to-lowest. The bits that are set to 1 in the hardware configuration register need not be contiguous.

In a further embodiment of the present invention, the check for permitting aliasing can be configurable. In this further embodiment, a pair of hardware registers is provided to specify the aliasing acceptance requirements for each bit that is claimed as an aliasing bit. For each aliasing bit M, the two corresponding bits in these hardware registers can be configured to select from the following rules: (00) bit M must be zero; (01) bit M must match sign bit [47]; (10) bit M must match the inverse of sign bit [47]; and (11) bit M must be one.

Figure 4:
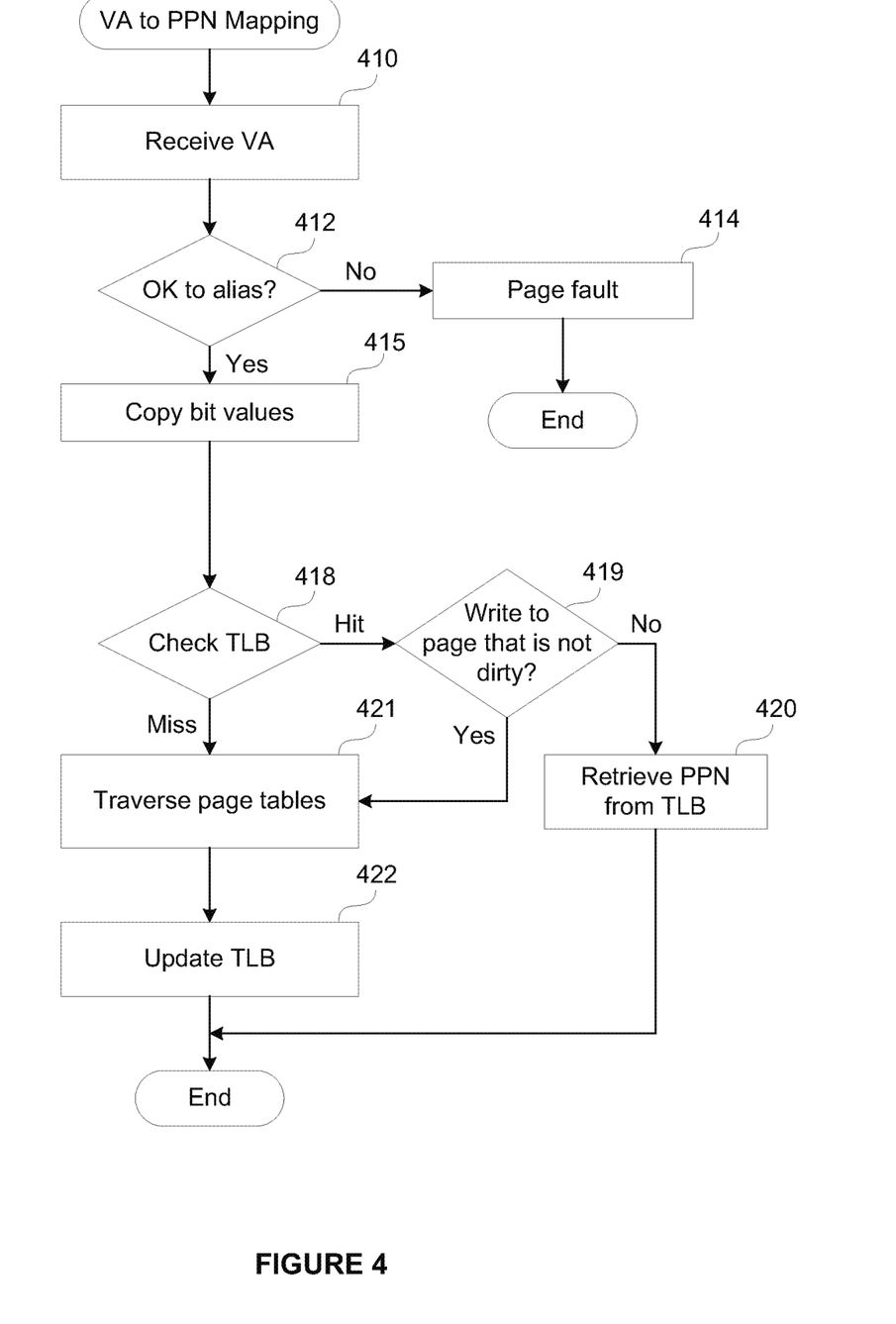
FIG. 4 is a flow diagram that illustrates the method for mapping virtual addresses to physical page numbers, according an embodiment of the present invention.

FIG. 4 is a flow diagram that illustrates the method for mapping virtual addresses to physical page numbers, according to an embodiment of the present invention. The mapping may be performed to carry out a read operation or a write operation. In the embodiment illustrated herein, the MMU (e.g., MMU 131 or MMU 231) is performing the mapping using TLB (e.g., TLB 132 or TLB 232) or page tables (e.g., page tables 133 or page tables 233). At step 410, the MMU receives the virtual address to be mapped in binary form. At step 412, the MMU checks to see if the creation of $2^M$ aliased virtual address regions within the page tables is permitted by confirming that bits [46:46-(M−1)], hereinafter called "virtual address bits for aliasing," have values equal to the sign bit at bit [47]. If the virtual address bits for aliasing do not have values equal to the sign bit, aliasing is not permitted and the method proceeds to step 414, where a page fault occurs and the virtual address translation is carried out by OS 110 in the case of the embodiment of FIG. 1 and by the VMM in the embodiment of FIG. 2. The method terminates after step 414. If the virtual address bits for aliasing have values that are equal to the sign bit, aliasing is permitted and the method proceeds to step 415, where the values of M most significant bits from bits [11:0] are respectively copied into bit [46] to bit [46-(M−1)].

The TLB is checked at step 418 to see if it contains a mapping for the modified virtual address, in particular bits [47:12] of the modified virtual address. If it does, another check is carried out at step 419 if the operation is a write operation. At step 419, it is determined whether the physical page that the TLB associates with the virtual address is indicated in the TLB as being dirty or not. If it is indicated as being dirty (associated dirty bit value=1), step 420 is carried out, where the physical page number that the TLB associates with the virtual address is retrieved from the TLB and the method terminates. If the physical page that the TLB associates with the virtual address is not indicated as being dirty (associated dirty bit value=0), step 421 is carried out, where the MMU traverses the page tables and updates the page tables to mark the physical page associated with the virtual address as being dirty. Returning to step 418, if the TLB misses, the MMU traverses the page tables at step 421 to obtain the physical page number associated with the virtual address. After the physical page number associated with the virtual address is obtained at step 421, that mapping along with the dirty bit value, which will be 1 in the case of a write operation, is added to the TLB at step 422, and the method terminates.

Figure 5:
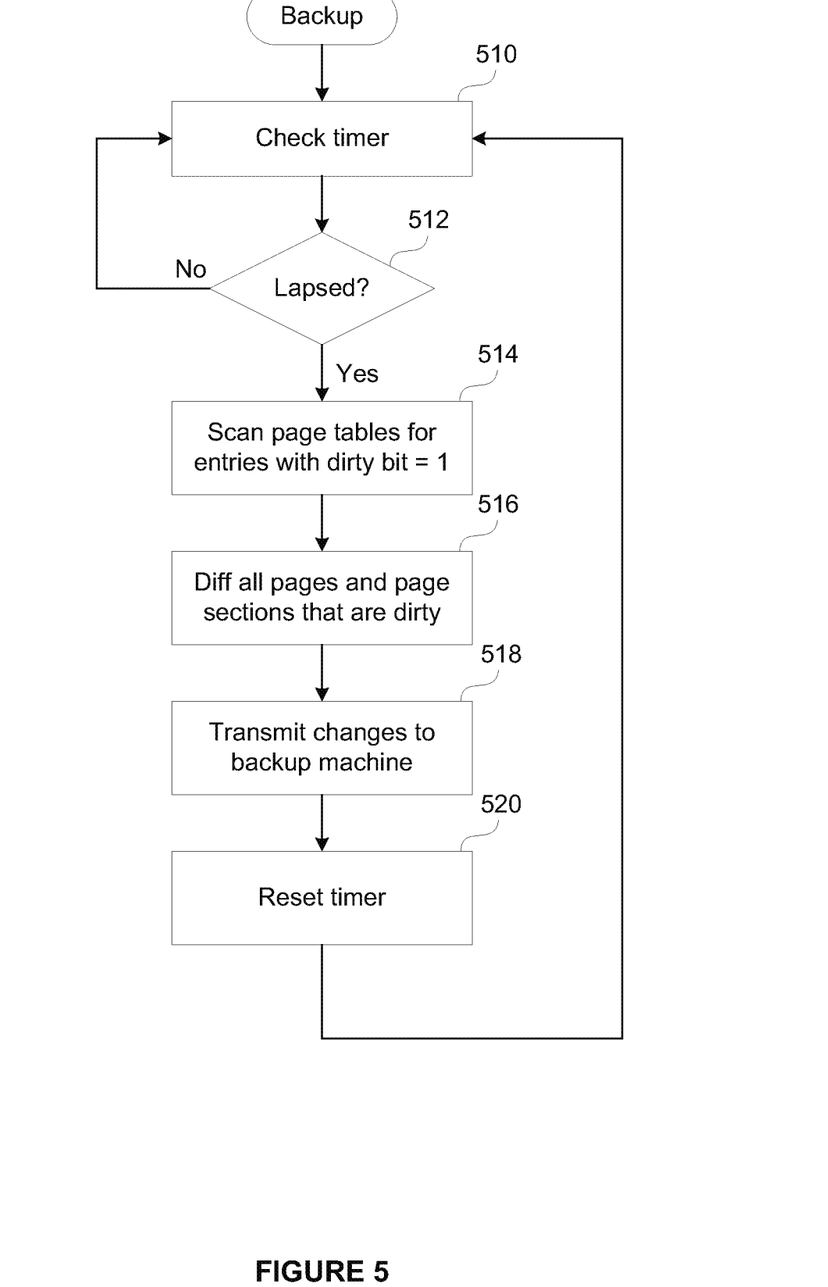
FIG. 5 is a flow diagram that illustrates the method for backing up a virtual machine, according an embodiment of the present invention.

FIG. 5 is a flow diagram that illustrates the method for backing up a virtual machine, according to an embodiment of the present invention. In the embodiment described herein, hypervisor 210 is carrying out this method on a periodic basis, and the time interval between backups is set in accordance with a recovery point objective (RCO) that is specified in a backup policy. The backup method described herein may be applied to provide fault-tolerant, high-availability VMs.

Steps 510 and 512 are carried out to see if the timer that has been set to the backup time interval has lapsed. If the timer has lapsed, hypervisor 210, at step 514, scans all bottom-level page tables for entries that have the dirty bit set to one. Then, at step 516, hypervisor performs a diff operation on all physical memory page sections referenced by entries in bottom-level page tables of fine-grained page tables that are dirty. In some cases, the diff operation is also performed on a portion of an adjacent physical memory page section if it is determined that a write operation that caused the physical memory page section to be dirtied may have also dirtied (i.e., spilled over to) the adjacent physical memory page section. For example, referring to FIG. 3, if bottom-level page table 324a indicates that the bottom half of page 325 is dirty via the value of its D bit 334 while bottom-level page table 324b indicates that the top half of page 325 is not dirty via the value of its D bit 335, a diff operation is performed on the bottom half of page 325 and the portion of the top half of page 325 adjacent to the bottom half of page 325 that could have been dirtied as a result of a write operation that began on the bottom half of page 325 and spilled into the top half of page 325. In one embodiment, where the maximum size of a single write operation is 16 or N bytes, the portion of the adjacent physical memory page section that also undergoes a diff operation is 15 or (N−1) bytes. At step 518, changes to physical memory page sections as determined through the diff operation are transmitted to a backup machine. Then, at step 520, the timer is reset, and the method returns to step 510.

In the embodiment of the present invention described above, the diff operation is used to minimize the amount of data being transmitted over the network. It should be recognized that other operations that reduce network bandwidth consumption, such as compression and precopy, may be employed in place of the diff operation.

Figure 6:
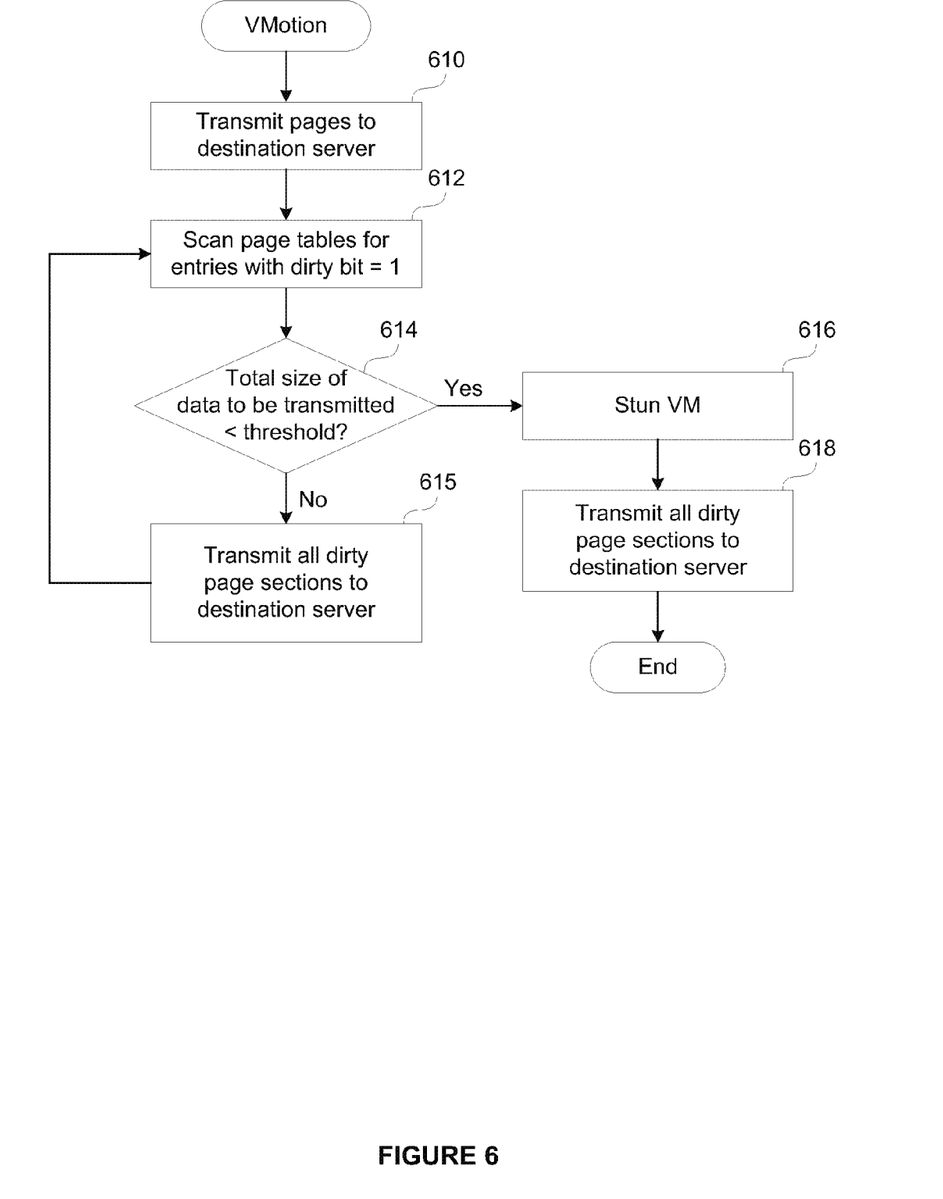
FIG. 6 is a flow diagram that illustrates the method for migrating an executing state of a virtual machine, according an embodiment of the present invention.

FIG. 6 is a flow diagram that illustrates the method for migrating an executing state of a virtual machine (VM), according to an embodiment of the present invention. In the embodiment described herein, hypervisor 210 is carrying out this method and, in doing so, transmits all physical memory pages of the VM to a destination server over a network. As a way to reduce the downtime of the VM, the VM is stunned and execution control is switched over to the destination server only when the total size of the physical memory pages left to be transmitted to the destination server is below a certain threshold. In addition, page tables referenced below correspond to shadow page tables being maintained by hypervisor 210 for the VM that is being migrated.

At step 610, all physical memory pages of the VM are transmitted to the destination server. While this is happening, the VM continues to run and some of these physical memory pages become dirtied and D bits in the entries of bottom-level page tables corresponding to these physical memory pages will be set to one. At step 612, bottom-level page tables of fine-grained page tables are scanned for entries that have the dirty bit set to one. Then, at step 614, the total size of data to be transmitted to the destination server is computed and compared against a threshold. The data to be transmitted includes physical memory page sections referenced by entries in bottom-level page tables of fine-grained page tables that have the D bit set to one. In some cases, the data to be transmitted includes a portion of an adjacent physical memory page section if it is determined that a write operation that caused the physical memory page section to be dirtied may have also dirtied the adjacent physical memory page section. If the total size computed at step 614 is not less than the threshold, all dirty physical memory page sections referenced by entries in bottom-level page tables of fine-grained page tables and any portions of adjacent physical memory page sections that could have been dirtied are transmitted to the destination server. The method then returns to step 612 to identify physical memory page sections that may have become dirtied while step 615 was being carried out.

Returning to the decision block at step 614, if the total size computed at step 614 is less than the threshold, the VM is stunned at step 616 and, at step 618, all dirty physical memory page sections referenced by entries in bottom-level page tables of fine-grained page tables and any portions of adjacent physical memory page sections that could have been dirtied are transmitted to the destination server. After step 618, the method terminates, and hypervisor 210 can hand over execution control of the VM to the destination server.

Alternative embodiments of the present invention include a backup method where the diff operation is not performed and entire physical memory page sections are transmitted to the backup machine, and a migration method where the diff operation is performed and only the changed parts of physical memory page sections are transmitted to the destination server In the examples given above, more granular dirty bit information provides savings in computational power in the case where diff operations are performed and only the changed portions are transmitted over the network to the target machine, and provides savings in network bandwidth consumption in the case where diff operations are not performed and physical memory page sections in their entirety are transmitted over the network to the target machine.

In a further embodiment of the present invention, the conventional component of the MMU that handles write operations that span more than one physical memory page is modified to also handle write operations that span more than one physical memory page section within a single physical memory page. With this modification, a write operation that spans more than one physical memory page section within a single physical memory page is translated into two separate write operations or two separate TLB and MMU interactions, each of which is confined to a single physical memory page section. As a result, a write operation that dirties a physical memory page section and spills over to another physical memory page section across a page section boundary to dirty the adjacent physical memory page section is translated into two separate write operations that cause the dirty bits in the PTEs that reference these two physical memory page sections to be set to 1. In addition, when checking to see if a write operation spans more than one physical memory page section within a single physical memory page, only the first and last bytes of the write operation are checked.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of backing up a virtual machine running in a first computer system, the first computer system having a memory management unit that manages mappings of virtual addresses to physical memory pages using hierarchically-arranged page tables, the method comprising:
   scanning entries of a first page table and a second page table distinct from the first page table, an entry in the first page table and an entry in the second page table each referencing a common physical memory page;
   determining that a first section of the common physical memory page is dirty based on the entry of the first page table that references the common physical memory page and
   determining that a second section of the common physical memory page is not dirty based on the entry of the second page table that references the common physical memory page; and
   transmitting at least a portion of the first section of the common physical memory page to a second computer system.

2. The method of claim 1, further comprising:
   performing an operation on the first section of the common physical memory page to determine changes to data stored therein; and
   transmitting the changes to the data stored in the first section of the common physical memory page to the second computer system.

3. The method of claim 2, wherein the first and second sections of the common physical memory page do not overlap and each has a size that is at most one-half the size of the common physical memory page.

4. The method of claim 2, wherein the first and second sections of the common physical memory page do not overlap and each has a size that is 1/(2M) of the size of the common physical memory page, where M is an integer greater than or equal to 1.

5. The method of claim 2, further comprising:
   performing an operation on a portion of the second section of the common physical memory page that is adjacent to the first section to determine changes to data stored in said portion of the second section of the common physical memory page; and transmitting the changes to the data stored in said portion of the second section of the common physical memory page to the backup second computer system.

6. The method of claim 1, further comprising:
transmitting the entire first section of the common physical memory page to the second computer system,
wherein the second computer system has a memory management unit that manages mappings of virtual addresses to physical memory pages using hierarchically arranged page tables, and
wherein the first section stores an executing state of the virtual machine.

7. The method of claim 6, further comprising:
stunning the virtual machine; and
transmitting all sections of physical memory pages that are dirty to the second computer system.

8. A non-transitory computer-readable medium that stores instructions that are executable by a first computer system, wherein the instructions, when executed, cause the first computer system to perform a method of backing up a virtual machine running therein, the first computer system having a memory management unit that manages mappings of virtual addresses to physical memory pages using hierarchically-arranged page tables, and wherein the method comprises:
scanning entries of a first page table and a second page table distinct from the first page table, an entry in the first page table and an entry in the second page table each referencing a common physical memory page;
determining that a first section of the common physical memory page is dirty based on the entry of the first page table that references the common physical memory page and determining that a second section of the common physical memory page is not dirty based on the entry of the second page table that references the common physical memory page; and
transmitting at least a portion of the first section of the common physical memory page to a second computer system.

9. The computer-readable medium of claim 8, wherein the method further comprises:
performing an operation on the first section of the common physical memory page to determine changes to data stored therein; and
transmitting the changes to the data stored in the first section of the common physical memory page to the second computer system.

10. The computer-readable medium of claim 9, wherein the first and second sections of the common physical memory page do not overlap and each has a size that is at most one-half the size of the common physical memory page.

11. The computer-readable medium of claim 9, wherein the first and second sections of the common physical memory page do not overlap and each has a size that is 1/(2M) of the size of the common physical memory page, where M is an integer greater than or equal to 1.

12. The computer-readable medium of claim 9, wherein the method further comprises:
performing an operation on a portion of the second section of the common physical memory page that is adjacent to the first section to determine changes to data stored in said portion of the second section of the common physical memory page; and
transmitting the changes to the data stored in said portion of the second section of the common physical memory page to the backup second computer system.

13. The computer-readable medium of claim 8, wherein the method further comprises:
transmitting the entire first section of the common physical memory page to the second computer system,
wherein the second computer system has a memory management unit that manages mappings of virtual addresses to physical memory pages using hierarchically arranged page tables, and
wherein the first section stores an executing state of the virtual machine.

14. The computer-readable medium of claim 13, wherein the method further comprises:
stunning the virtual machine; and
transmitting all sections of physical memory pages that are dirty to the second computer system.

15. A computer system comprising:
a memory; and
a processor having a memory management unit that manages mappings of virtual addresses to physical memory pages using hierarchically-arranged page tables, and configured to perform a method of backing up a virtual machine running on the computer system, wherein the method comprises:
scanning entries of a first page table and second page table distinct from the first page table, an entry in the first page table and an entry in the second page table each referencing a common physical memory page;
determining that a first section of the common physical memory page is dirty based on the entry of the first page table that references the common physical memory page and determining that a second section of the common physical memory page is not dirty based on the entry of the second page table that references the common physical memory page; and
transmitting at least a portion of the first section of the common physical memory page to a second computer system.

16. The system of claim 15, wherein the method further comprises:
performing an operation on the first section of the common physical memory page to determine changes to data stored therein; and
transmitting the changes to the data stored in the first section of the common physical memory page to the second computer system.

17. The system of claim 16, wherein the first and second sections of the common physical memory page do not overlap and each has a size that is at most one-half the size of the common physical memory page.

18. The system of claim 16, wherein the first and second sections of the common physical memory page do not overlap and each has a size that is 1/(2M) of the size of the common physical memory page, where M is an integer greater than or equal to 1.

19. The system of claim 16, wherein the method further comprises:
performing an operation on a portion of the second section of the common physical memory page that is adjacent to the first section to determine changes to data stored in said portion of the second section of the common physical memory page; and
transmitting the changes to the data stored in said portion of the second section of the common physical memory page to the backup second computer system.

20. The system of claim 15, wherein the method further comprises:

transmitting the entire first section of the common physical memory page to the second computer system, wherein the second computer system has a memory management unit that manages mappings of virtual addresses to physical memory pages using hierarchically arranged page tables, and wherein the first section stores an executing state of the virtual machine.

* * * * *